B. WILBUR.
SANITARY MILK CARRIER.
APPLICATION FILED APR. 8, 1916.
1,328,937. Patented Jan. 27, 1920.
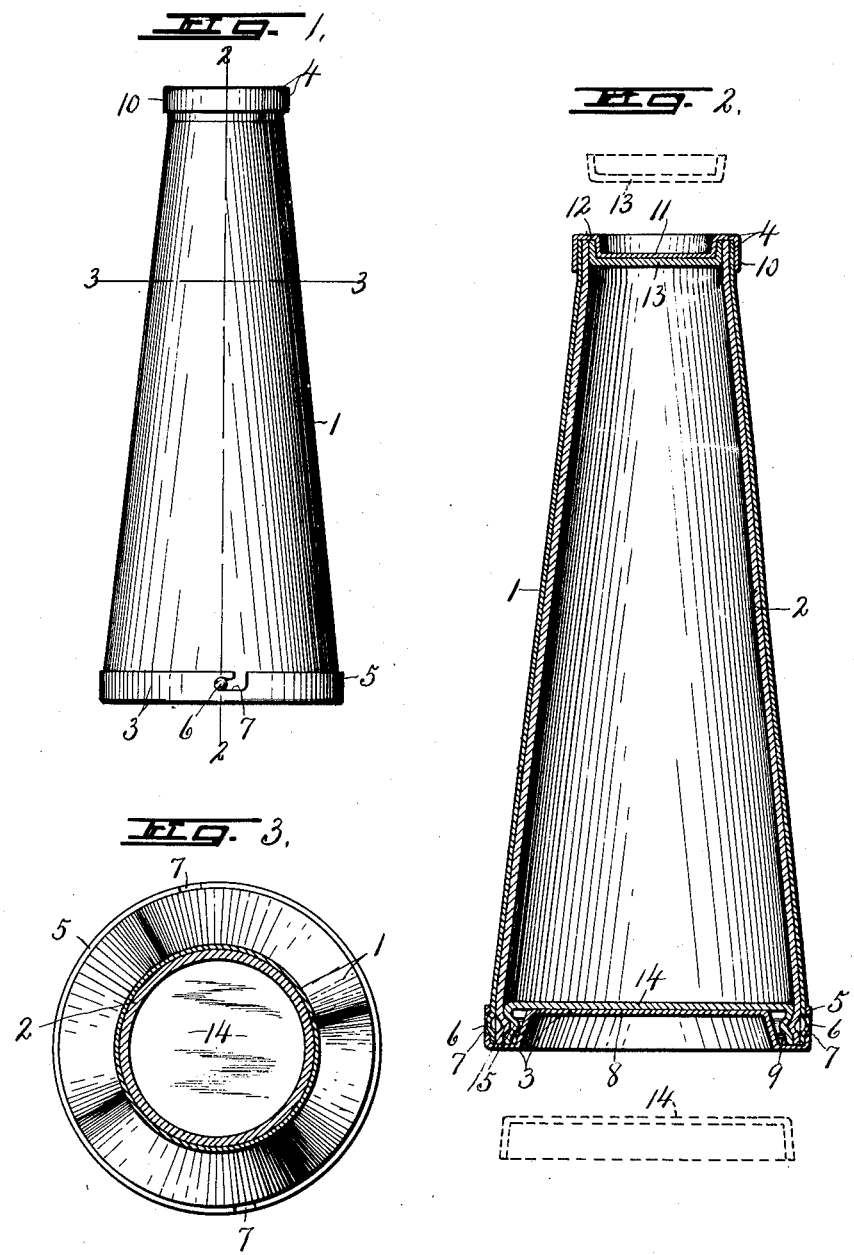

UNITED STATES PATENT OFFICE.

BURT WILBUR, OF SYRACUSE, NEW YORK, ASSIGNOR OF ONE-HALF TO GEORGE H. JONES, OF SYRACUSE, NEW YORK.

SANITARY MILK-CARRIER.

1,328,937. Specification of Letters Patent. Patented Jan. 27, 1920.

Application filed April 8, 1916. Serial No. 89,911.

*To all whom it may concern:*

Be it known that I, BURT WILBUR, a citizen of the United States of America, and resident of Syracuse, in the county of Onondaga, in the State of New York, have invented new and useful Improvements in Sanitary Milk-Carriers, of which the following, taken in connection with the accompanying drawings, is a full, clear, and exact description.

This invention relates to certain improvements in sanitary milk carriers adapted to be used by bottlers and retailers in the transportation and distribution of milk and other liquids to individual patrons.

At the present time glass bottles are most commonly used and reused for this purpose, but the peculiar susceptibility of the milk to deterioration, particularly in small quantities which may collect and dry on the inside of the interior walls of the bottle after being emptied, together with the fact that the mouth of the bottle is usually restricted, makes it extremely difficult to properly clean and sterilize the same for reuse, so that there is always present the dangers of contamination and infection arising from the unsanitary conditions of the reused bottles.

The main object, therefore, of my present invention is to obviate these unsanitary conditions by preventing the reuse of the receptacles in which the milk is delivered to the patrons.

In other words, I have sought to provide a light, durable and comparatively inexpensive bottle of water-proof paper or its equivalent in which the milk is delivered directly to the patron so that it may be destroyed after being emptied and at the same time to protect said bottle against injury when filled and stored or transported from place to place by means of a similarly formed shield of stronger material, such as sheet metal which may be returned to the bottler for reuse with other similar bottles.

Another object is to construct both the main bodies of the bottle and its protective shield in such manner that a considerable number of each may be stored or transported in relatively small compact space by telescoping them one within the other so that the assembled units may protect each other against deformation or breakage.

Other objects and uses relating to specific parts of the bottle will be brought out in the following description.

In the drawings—

Figure 1 is a face view of a complete device embodying the various features of my invention the bottle being inclosed within the shield.

Fig. 2 is an enlarged vertical sectional view of the same, taken on line 2—2, Fig. 1.

Fig. 3 is an enlarged horizontal sectional view, taken on line 3—3, Fig. 1.

As illustrated, this device comprises outer and inner conical shells —1— and —2— the inner shell constituting a bottle for receiving a predetermined quantity of milk, while the outer shell constitutes a protective shield for the bottle, each shell being tapered or gradually reduced in diameter from bottom to top so that the sides thereof are substantially straight longitudinally and circular in cross section, both shells being of substantially the same length.

The outer shell or shield —1— is preferably made of comparatively thin sheet or drawn metal, such as aluminum, or other non-corrodible material and is provided with a removable bottom or cap —3— and a removable top or cap —4— of the same material, the bottom cap —3— being provided with an upturned annular flange —5— fitting closely upon the outer face of the lower end of the shell —1— and is adapted to be interlocked therewith by any suitable catch or fastening means, preferably through the medium of diametrically opposite raised bosses or projections —6— pressed up from the adjacent portion of the main body and engaging in angular slots —7— in the flange —5—, thus constituting a bayonet lock for holding the main body and bottom cap against relative endwise movement when adjusted for use and also serving to hold the shield on the bottle and the bottle in the shield.

The central portion of the bottom cap —3— is pressed upwardly to a height nearly equal to the vertical height of the flange —5— to form a flat annular support —8— for the bottom of the bottle —2—, and also forms an annular channel —9— between the flange —5— and annular support —8— for receiving the bottom flange of said bottle and lower end of the shield —1—, as shown more clearly in Fig. 2.

The form of the top or cap —4— of the outer shell or shield —1— is similar to that of the bottom —3—, except that it is smaller and inverted, it being provided with an annular flange —10— and a central depressed portion —11— forming with the annular flange —10— an annular channel —12— for receiving the upper ends of both shells and the marginal edge or flange of a cup-shaped stopper —13—, the flange —10— being closely fitted over and upon the outer face of the upper end of the protective shield —1—, while the depressed portion —11— projects into the outer end of the bottle —2— for a purpose hereinafter described.

The main body of the shell —1— is preferably continuous and jointless from end to end, and when the caps —3— and —4— are removed, it is evident that a large number of them may be telescoped one within the other in relatively small compact space for storage or transportation, thereby protecting one another against denting or excessive bending when handled in large quantities.

The bottle —2— is preferably made of paper or equivalent comparatively inexpensive material treated with paraffin or similar substance to render it moisture proof and capable of retaining the milk without loss.

The main body of the bottle —2— is continuous or jointless from end to end and is of substantially the same length as the outer metal shell —1—, the exterior diameters thereof at all points in its length corresponding to the interior diameters of similar points of the main body of the outer shell —1— so that when the bottle —2— is placed telescopically within the outer shell —1—, both shells will contact at all points throughout their lengths and circumference.

The bottle —2— is provided with an inverted cup-shape bottom —14— of approximately the same vertical height as the flange —5— of the cap or bottom 3 and also of the same exterior diameter as the interior diameter of the lower end of the main body of the bottle —2— in which it is tightly fitted and retained by crimping or beading the adjacent portions thereof inwardly, as at —15—, just below the flat upper portion of the bottom, the joint being usually sealed with paraffin or equivalent substance to prevent any possibility of leakage.

The bottom —14— of the bottle —2— is, therefore, made separate from the main body and, as shown by dotted lines beneath Fig. 2, its sides are slightly tapered so as to cause it to wedgingly fit tightly within the lower end of said main body before it is secured thereto by the crimping or beading —15—, it being understood that the bottom as well as the main body of the bottle is usually saturated or treated with paraffin or equivalent substance before being assembled, so that when the bottom —14— is pressed into the lower end of the receptacle —2— the beading —15— may be formed by a heated iron or roller so as to soften the paraffin at the joint between the beads and thereby more effectively seal such joint against leakage.

The stopper —13— is also made of the same material as the main body and cup-shape, and, as shown by the dotted lines at the top of Fig. 2, its sides are slightly tapered so as to cause it to wedgingly fit tightly within the mouth of the bottle —2— in which it is usually forced under pressure.

The vertical depth of the stopper is substantially equal to that of the depressed portion —11— of the cap —4— which serves to reinforce the stopper against buckling, particularly in transportation when the contents of the bottle are more or less agitated, the metal bottom —8— of the outer shell —1— serving a similar purpose for the paper bottom —14— of the bottle.

As previously stated, the bottom —14— of the bottle is made separately from the main body in the form shown by dotted lines below Fig. 2, and it therefore, follows that when the bottoms are removed, the main bodies of the bottles —2— may be stored and shipped in large quantities in relatively small compact space by telescoping one within the other, thereby protecting one another to a large extent against injury in handling, particularly in transportation from the place of manufacture to the place of bottling of the milk where the bottoms —14— are usually applied and secured in place by a suitable beading or crimping tool in the manner described.

The conical or tapering structure of both of the shells —1— and —2— not only renders them strong and durable and facilitates the assembling of one within the other so as to contact throughout all points in their areas, but also greatly reduces the expense of transportation and storage and causes the shields with the bottles therein to stand more securely in an upright position with less liability of striking one another by lateral vibration due to jolting when in transportation from place to place.

The bottle with the milk therein and the shield thereon is conveyed to the place of delivery, whereupon the bottom cap —3— of the shield is unlocked and removed by a slight turn or by turning the shield relatively thereto, thus permitting the entire bottle with the stopper therein to be withdrawn downwardly from the shield, or the shield withdrawn upwardly from the bottle which is delivered to the patron, the entire shield being retained by the deliveryman and returned to the bottler.

As soon as the bottle has been emptied of its contents by the patron, it is destroyed, thereby preventing its reuse, while the shield which has been returned to the bottler may be used repeatedly for the reception and delivery of other milk-containing bottles and, as previously stated, when the bottom caps —3— and —4— are removed any number of them may be telescoped one within the other within a small compact space for return transportation, the space within the telescoping bodies being utilized for the reception of the smaller caps if desired.

The bottom caps —3— may be placed in small compact space in any other suitable receptacle provided therefor where they may be protected from injury.

What I claim is:

In combination with a milk carrier comprising an elongated paper tube gradually tapered from one end to its opposite end to form a bottle, the smaller end of which constitutes the top, an inverted cup-shaped paper bottom tightly fitted within the larger end of the tube and permanently secured thereto, a cup-shaped paper stopper tightly fitted in the smaller end of the tube, an outer metal tubular casing of substantially the same length and taper as the paper tube wedgingly fitted upon the exterior of said paper tube by downward sliding pressure, a metal bottom having an upwardly pressed central portion inserted within the inverted cup-shaped bottom of the paper tube and resting against the under side of said paper bottom, said metal bottom having an upturned marginal flange fitted upon the periphery of the adjacent lower end of the metal casing and detachably interlocked therewith, and a metal cap having a depressed central portion fitting within and against the bottom of the stopper and also provided with a marginal flange fitted upon the periphery of the upper end of the metal casing.

In witness whereof I have hereunto set my hand this 31st day of March, 1916.

BURT WILBUR.

Witnesses:
H. E. CHASE,
ALICE M. CANNON.